United States Patent
Stephens et al.

(10) Patent No.: US 7,066,469 B2
(45) Date of Patent: Jun. 27, 2006

(54) SEAL ASSEMBLY FOR MACHINERY HOUSING

(75) Inventors: Lyndon Scott Stephens, Lexington, KY (US); Kevin W. Kelly, Batonrouge, LA (US)

(73) Assignees: University of Kentucky Research Foundation Board of Supervisors of Louisiana State University, Lexington, KY (US); Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 10/213,233

(22) Filed: Aug. 6, 2002

(65) Prior Publication Data

US 2004/0026871 A1 Feb. 12, 2004

(51) Int. Cl.
*F16J 15/34* (2006.01)

(52) U.S. Cl. ......................... 277/359; 277/370
(58) Field of Classification Search ................ 277/358, 277/359, 360, 370, 399, 401, 408, 930; 165/86, 165/185, 907
See application file for complete search history.

(56) References Cited

U.S. PATENT DOCUMENTS

| 4,005,747 A | | 2/1977 | Ball |
| 4,114,899 A | * | 9/1978 | Kulzer et al. ............... 277/367 |
| 4,123,069 A | | 10/1978 | Sato |
| 4,133,541 A | * | 1/1979 | Kirk ........................... 227/65 |
| 4,365,815 A | * | 12/1982 | Scott ........................... 277/387 |
| 4,872,689 A | * | 10/1989 | Drumm ....................... 277/408 |
| 5,145,001 A | * | 9/1992 | Valenzuela .................. 165/164 |
| 5,160,149 A | * | 11/1992 | Winn ......................... 277/362 |
| 5,538,260 A | | 7/1996 | Takenaka et al. |
| 5,791,045 A | * | 8/1998 | Yamamoto et al. ...... 29/890.03 |
| 5,947,481 A | | 9/1999 | Young |
| 6,003,875 A | | 12/1999 | Ellis et al. |
| 6,109,376 A | | 8/2000 | Pearce |
| 6,120,034 A | | 9/2000 | Kowalski et al. |
| 6,135,458 A | * | 10/2000 | Fuse ........................... 277/401 |
| 6,149,160 A | | 11/2000 | Stephens et al. |
| 6,427,790 B1 | * | 8/2002 | Burr ........................... 175/371 |
| 6,536,774 B1 | * | 3/2003 | Vuksanovic ................ 277/390 |

FOREIGN PATENT DOCUMENTS

| EP | 290752 A2 * | 11/1988 |
| JP | 58146770 | 9/1983 |
| JP | 59194171 | 11/1984 |
| JP | 60037462 | 2/1985 |

OTHER PUBLICATIONS

Kelly, K.W. et al., " Industrial Applications for LIGA–fabricated Micro Heat Exchangers", SPIE 2001 Symposium on Micromachining and Microfabrication, Proceedings 4559 San Francisco Oct. 2001.

(Continued)

*Primary Examiner*—Alison Pickard
*Assistant Examiner*—Vishal Patel
(74) *Attorney, Agent, or Firm*—King & Schickli, PLLC

(57) ABSTRACT

A seal assembly for a machinery housing includes a seal ring having a micro heat exchanger and a gland plate for securing the seal ring to the machinery housing. The gland plate includes a cooling fluid port in communication with the micro heat exchanger.

23 Claims, 7 Drawing Sheets

OTHER PUBLICATIONS

Kountouris, D.K., "Fabrication, Modeling and Testing of a Thrust Bearing Surface with Integral Micro Heat Exchanger," Masters Thesis, Louisana State University Dec. 1999.

Bejan, A., et al., "Optimal Arrays of Pin Fins and Plate Fins in Laminar Forced Convection", Journal of Heat Transfer, vol. 115, pp. 75–81; Feb. 1993.

Kennedy, F.E., et al., "Thermo–Mechanical Analysis of Dry Sliding Systems", Computers & Structures, vol. 26, pp. 345–355, 1987.

Kennedy, F.E., et al., "Contact Conditions and Wear of Hard Seal Faces Against Carbon Graphite", Lubrication Engineering, vol. 44, 4 361–367.

Kennedy, F.E., et al., "Thermocracking and Wear of Ceramic–Coated Face Seals for Salt Water Applications, Lubrication Engineering", vol. 46, 10, 663–671.

Yin, X., et al., "Heat Exchangers Consisting of Pin Arrays", J.Electronic Packaging, vol. 119, pp. 51–57, Mar. 1997.

Kelly, P.J., et al., "Enhanced Mechanical Seal Performance Through CVD Diamond Films," VACUUM, vol. 61 (2001), pp. 61–74.

Stephens, L.S., Kelly, K.W., Kountouris, D., McClean, J., and Coynell, J., "A Micro Heat Sink for Cooling Macro–Scale Conformal Surfaces Under the Influence of Thrust and Frictional Forces", IEEE/ASME Journal of Microelectromechanical Systems, vol. 10, No. 2, Jun., 2001, pp. 222–231.

Cusano, C., "Lubrication of Porous Journal Bearings," Journal of Lubrication Technology, vol. 94, pp. 69–73 (1972).

Divikar, R., "Sintered Silicon Carbides With Controlled Porosity for Mechanical Face Seals Applications," Lubrication Engineer, vol. 50, pp. 75–80 (1993).

* cited by examiner

SEAL ASSEMBLY FOR MACHINERY HOUSING

The development of this invention was funded by the Government under grant DABT63-95-C-0020 awarded by the Defense Advanced Research Projects Agency. The Government has certain rights in this invention.

TECHNICAL FIELD

This invention pertains to bearings and seals with improved mechanical properties, and to improved cooling or heating jackets for heat transfer in bearings, seals, and other devices.

BACKGROUND OF THE INVENTION

Seals and bearings are among the most widely used components in industry. There is a continuing need for seals and bearings that can operate under higher loads, higher speeds, or higher temperatures. There is a particular need for an inexpensive, "dry-running" mechanical seal, one that does not require periodic re-application of liquid lubricant. Previous dry-running mechanical seals have used a buffer gas instead of a liquid to lubricate the seal faces. However, existing dry-running gas seals are either very expensive, or are designed only for temporary, "backup" uses; and in either case are not usable in some applications.

Three more-or-less distinct lubrication regimes are encountered in typical load-bearing applications: hydrodynamic lubrication, elasto-hydrodynamic lubrication, and boundary lubrication. A given load-bearing application may involve one or more of these regimes.

Hydrodynamic lubrication is the best understood and most commonly encountered regime. In this regime the sliding surfaces are large conforming areas that produce a converging wedge of fluid as they move past one another. The sliding surfaces remain separated by the pressure within the converging wedge. However, because the sliding surfaces are conforming areas, the fluid pressure is sufficiently low that the surfaces do not deform substantially under the load caused by this pressure. Typically, fluid pressures are less than 5 Mpa and film thicknesses are greater than 1 µm. Two of the many types of load bearing applications that rely on hydrodynamic lubrication are a stator-journal bearing comprising a stator and a journal and a shaft-thrust bearing comprising a shaft and thrust bearing. A few of the many other examples of load bearing applications that rely on hydrodynamic lubrication include squeeze film, journal, slider, and hydrostatic bearings; and dry-running "extended life" gas seals (the last item as distinguished from backup-use-only, dry-running gas seals that are not hydrodynamically lubricated, and that have typical life spans of a few hours).

Elasto-hydrodynamic lubrication occurs when the mating bearing surfaces are non-conforming areas that produce very high fluid film pressures. This lubrication regime is similar to hydrodynamic lubrication, except that the fluid pressures are sufficiently high to deform the mating bearing surfaces. The surfaces typically experience some rolling contact and some sliding contact with one another. This contact, coupled with the fluid viscosity and geometry, can generate very high fluid pressures. These high pressures increase the viscosity of the lubricant to a point at which it behaves almost as a solid. Typically, fluid pressures are in the range 0.5–3.0 Gpa, and film thicknesses are greater than 0.1 µm. Two of the many load bearing applications that rely on elasto-hydrodynamic lubrication are a roller bearing and a ball bearing.

Boundary lubrication occurs when the lubricant film between the two bearing surfaces is very small, and significant solid-to-solid contact results. Boundary lubrication is produced by very thin surface lubricant films (typically of molecular size). Frictional resistance and wear (bearing life) are determined by the chemical and physical properties of the solids and lubricant at the interface. Boundary lubrication typically occurs in applications where sliding speeds are low and loads are very high. The maximum film thicknesses are 1–10 nm.

Under any of these lubrication regimes, the parameters that determine the performance of the load bearing surface include the coefficient of friction, wear, load bearing capacity, and temperature of the surfaces. Bearing and seal designs have historically focused upon enhancing these properties. For example, porous metal bearings and porous sintered carbide seal faces have been formed by etching processes to create pores that can store lubricant via capillary action. See, e.g., C. Cusano, "Lubrication of Porous Journal Bearings," *Journal of Lubrication Technology*, vol. 94, pp. 69–73 (1972); R. Divikar, "Sintered Silicon Carbides with Controlled Porosity for Mechanical Face Seals Applications," *Lubrication Engineering*, vol. 50, pp. 75–80 (1993). The lubricant is then released when the temperature increases, creating a self-lubricating surface.

Triangular, low aspect ratio asperities have been etched into surfaces to store and pump lubricant to different regions of certain types of bearings and seals. See U.S. Pat. Nos. 3,572,730 and 3,586,340. The aspect ratios of these triangular asperities were very low: the minimum horizontal dimension was said to be 0.005 inches, and the maximum vertical dimension 500 microinches. Thus the maximum aspect ratio of an asperity consistent with the teachings of these patents is: maximum height/minimum width=0.0005/0.005=0.1. In fact, the patents teach that the maximum depth of 500 microinches is undesirable, because excessive amounts of lubricant leak through until the asperities wear down to 100 microinches. Thus these patents affirmatively suggest that superior results are obtained with aspect ratios significantly lower than 0.1.

Other research has investigated the potential use of microstructures etched into the surface of hydrodynamic bearings to improve load capacity, stiffness and damping of the bearing. See I. Busch-Vishniac, I. et al., "Smart Hydrodynamic Bearings with Embedded MEMS Devices," Internet reference, http://www.me.utexas.edu/~microbot/smartbearings.html (1997).

As set forth in U.S. Pat. No. 6,149,160, it has been discovered that the properties of mechanical bearings and mechanical seals can be significantly improved by covering the load-bearing surfaces with large fields of high aspect ratio microstructures (HARMs), such as microchannels or microposts. The HARMs can substantially enhance heat transfer capability and lubricant flow. Benefits include reduced operating temperatures, precise metering of lubricant flow to all affected surfaces, increased reliability, increased life, higher maximum rotational speed, and the ability of the seal or bearing to run "dry," that is, without periodic reapplication of liquid lubricant.

The invention disclosed in the U.S. Pat. No. 6,149,160 patent may be used with a variety of bearings and mechanical seals, including but not limited to ball bearings, roller bearings, journal bearings, air bearings, magnetic bearings, single mechanical seals, double mechanical seals, tandem mechanical seals, bellows, pusher mechanical seals, and all types of rotating and reciprocating machines. The invention may also be used in regimes of hydrodynamic lubrication, elasto-hydrodynamic lubrication, and boundary lubrication.

The present invention relates to a modification of these structures and the gland plate which results in improved cooling jackets for use with bearings, seals, or other objects where improved heat transfer for cooling (or heating) is needed.

SUMMARY OF THE INVENTION

In accordance with the purposes of the present invention as described herein, an improved seal assembly is provided for a machinery housing. That seal assembly comprises a seal ring having a micro heat exchanger and a gland plate for securing the seal ring to the machinery housing. The gland plate includes a first cooling fluid port in communication with the micro heat exchanger. The gland plate may further include a second cooling fluid port in communication with the micro heat exchanger. In such an embodiment the first cooling fluid port acts as a cooling fluid inlet while the second cooling fluid port acts as a cooling fluid outlet. Additionally, the assembly includes a cooling fluid supply for circulating cooling fluid through the micro heat exchanger.

Still further describing the invention, the gland plate includes an annular groove and a group of cooling fluid distribution and collection ports in communication with the annular groove and the micro heat exchanger. The cooling fluid and collection ports have a flow area A, where $A \geqq 5B$ and B=the flow area of the micro heat exchanger.

Still further, the seal ring of the assembly includes a heat sink cover plate and a backing ring. The micro heat exchanger comprises a plurality of cooling fins carried on one of the heat sink cover plate and the backing ring. Each of the plurality of cooling fins is a cross-sectional dimension of between about 10–1000 microns. The edge-to-edge spacing between adjacent cooling fins is about 100–1000 microns. Further, the heat sink cover plate has a thickness of about 10–5000 microns.

The plurality of cooling fins may have a cross-sectional shape selected from a group consisting of round, elliptical, polygonal, triangular, rectangular, square, hexagonal, star-shaped, pentagonal, trapezoidal, octagonal and mixtures thereof. Still further the cooling fins or the cover plate may be coated with a material selected from a group consisting of silicon carbide, tungsten carbide, carbon graphite, silicon nitride, diamond-like carbon and mixtures thereof.

Still further, the assembly may include a third port in the gland plate for delivering an exterior cooling flush fluid to the seal assembly. The gland plate may include a labyrinth type seal. Additionally, the seal ring may include at least one O-ring seal for sealing the cooling fluid in the micro heat exchanger.

In the following description there is shown and described several embodiments of this invention, simply by way of illustration of some of the modes best suited to carry out the invention. As it will be realized, the invention is capable of other different embodiments and its several details are capable of modification in various, obvious aspects all without departing from the invention. Accordingly, the drawings and descriptions should be regarded as illustrative in nature and not as restrictive.

BRIEF DESCRIPTION OF THE DRAWINGS

The accompanying drawing incorporated in and forming a part of this specification, illustrates several aspects of the present invention, and together with the description serves to explain the principles of the invention. In the drawing:

FIG. 5b is a schematical top plan view of one possible cooling fin arrangement of the micro heat exchanger shown in FIG. 5a.

Reference will now be made in detail to the present embodiments of the invention as illustrated in the accompanying drawing figures.

DETAILED DESCRIPTION OF THE INVENTION

Figure 1A:
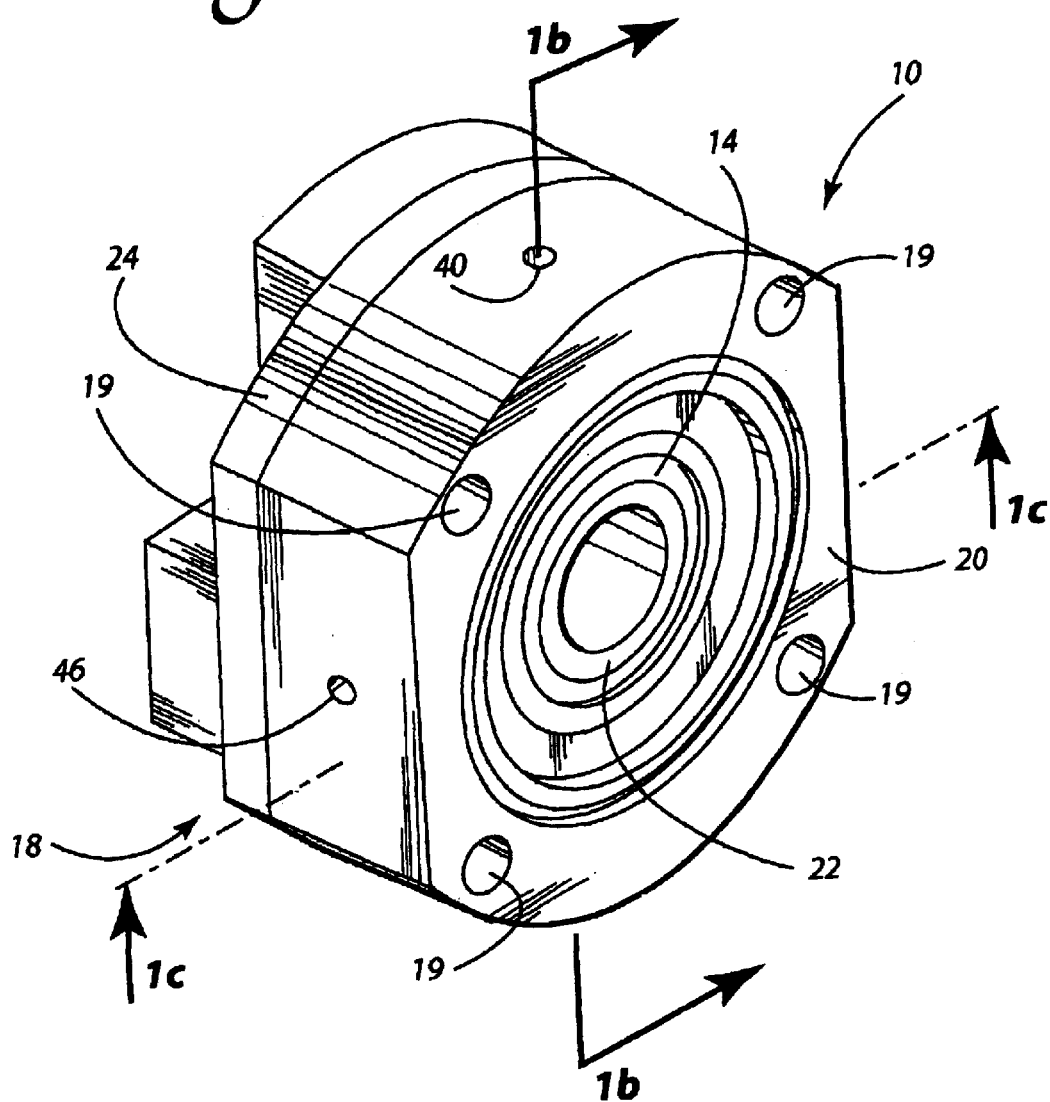
FIG. 1a is a perspective view of a first embodiment of the present invention.
Figure 1B:
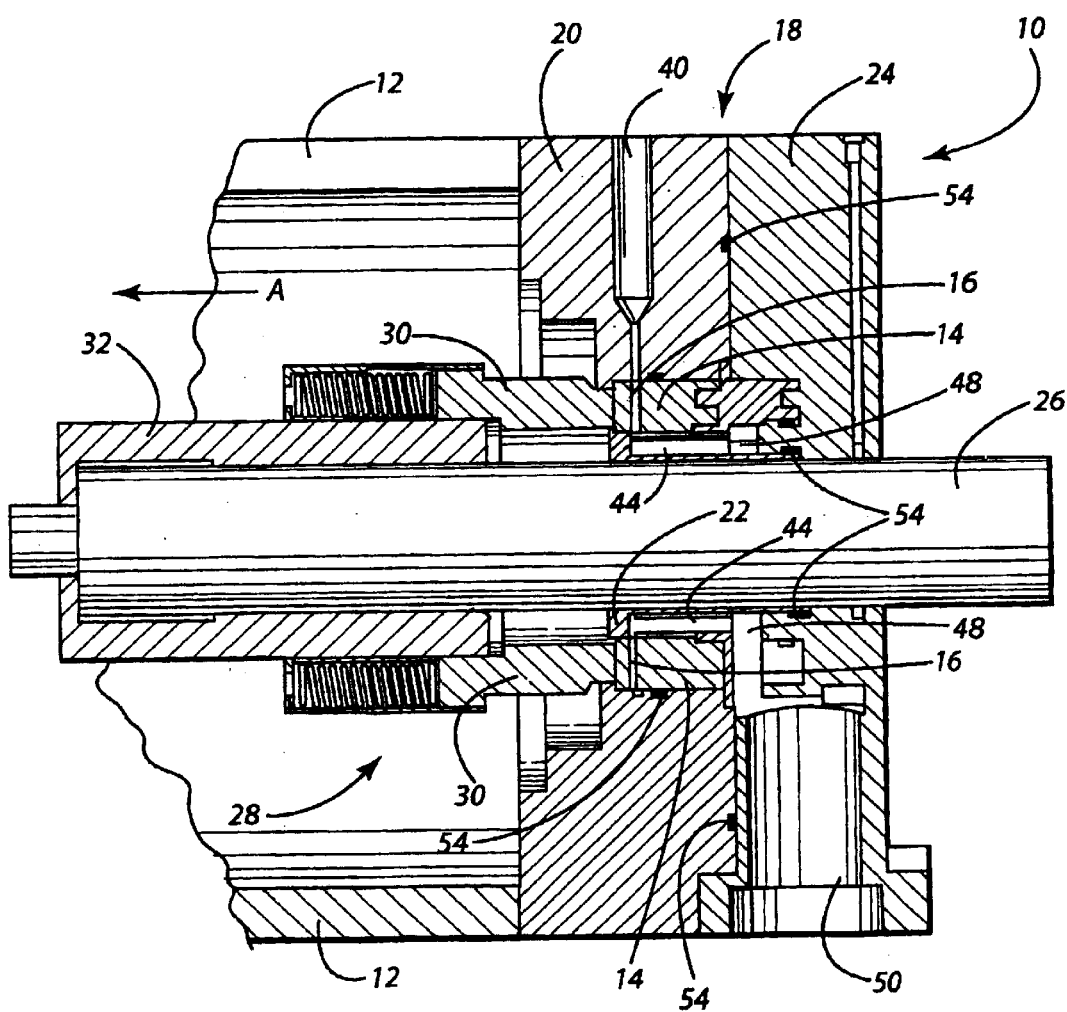
FIG. 1b is a cross sectional view of the first embodiment taken along 1b—1b.
Figure 1C:
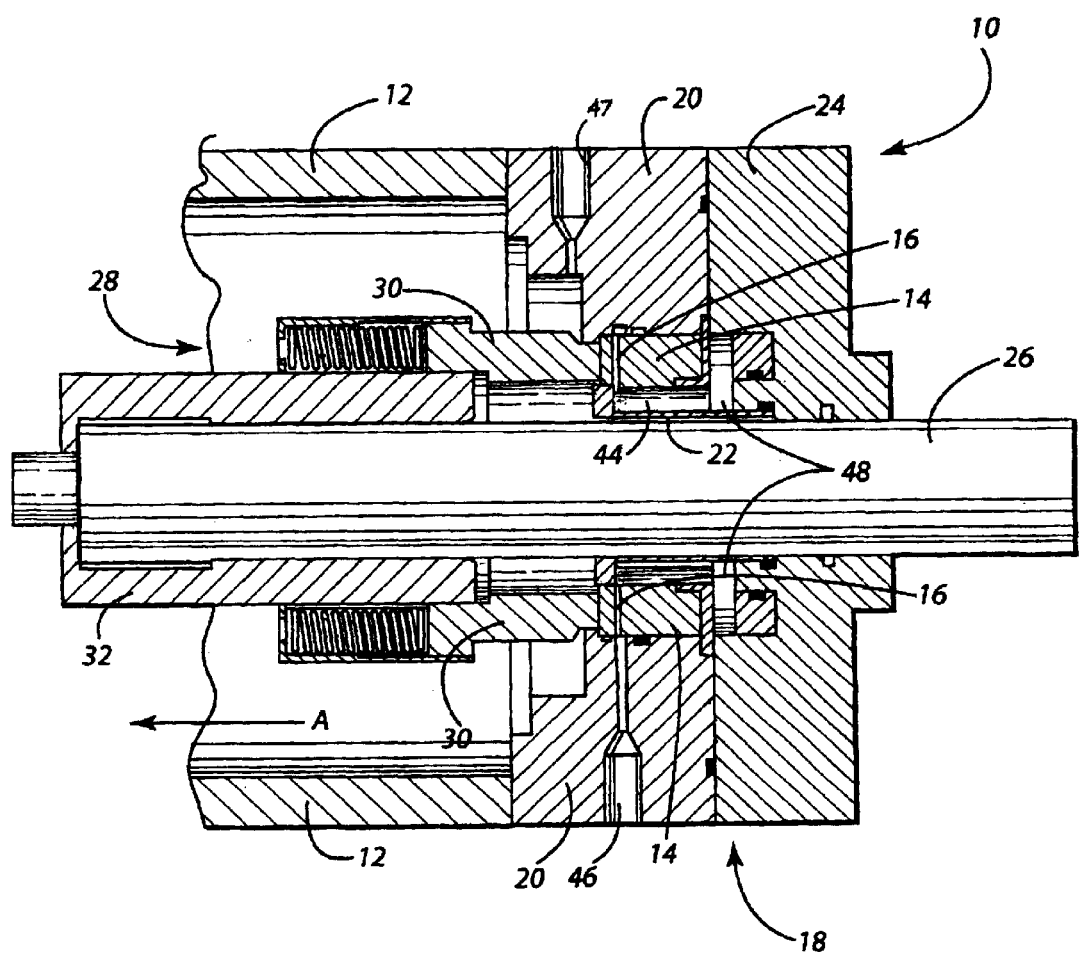
FIG. 1c is a cross sectional view of the first embodiment taken along line 1c—1c.

Reference is now made to FIGS. 1a–1c showing a first embodiment of the seal assembly 10 of the present invention that is secured to a machinery housing such as a pump housing 12 to seal pressurized fluids in centrifugal pumps and compressors. The seal assembly 10 may be generally described as including a stationary seal ring 14 including a micro heat exchanger 16 and a gland plate, generally designated by reference numeral 18, for securing the seal ring 16 to the pump housing 12 by bolts (not shown) or other appropriate fastening means passing through the apertures 19. In the embodiment shown in FIG. 1, the gland plate 18 is formed from three cooperating elements; an outer adaptor ring 20, an inner adaptor ring 22 and an end cap 24. The pump drive shaft 26 extends through the gland plate 18. An impeller (not shown) is mounted in the pump housing 12 and is rotated by means of the drive shaft 26 to pump pressurized fluid in a desired direction shown by action arrow A.

Pressurized fluid is prevented from leaking from the pump housing 12 past the gland plate 18 through the provision of a rotary mechanical seal generally designated by reference numeral 28. The rotary mechanical seal 28 includes a rotary seal ring 30 that is spring mounted, pre-loaded and connected to the drive shaft 26 by means of the support sleeve 32 and set screws (not shown).

The rotary sealing ring 30 and stationary seal ring 14 provide a dynamic seal for the fluid being pumped and also prevent contamination of the sealed fluid from the environment. Typical rotating speeds for mechanical pump and compressor shafts are 1000–10,000 RPM. Because the end faces of the two rings 14, 30 are pushed together to create a seal, the relative rotation at such high speeds creates significant frictional heating and wear at the sealing interface. As a result, mechanical seals are the least reliable component in pumps and compressors, accounting for 40 to 70% of all general purpose rotating machinery failures worldwide. According to several sources, mechanical seal repairs exceed $200 million per year worldwide. In an attempt to reduce the temperature of the seal interface, conventional designs use an exterior cooling flush that is injected onto the outer diameter of the sealed rings 14, 30.

While this practice reduces the average temperature of the seal ring, it does not effectively cool the interface to a uniform temperature nor does it sufficiently reduce the propensity for thermal hot spots to develop.

Figure 5A:
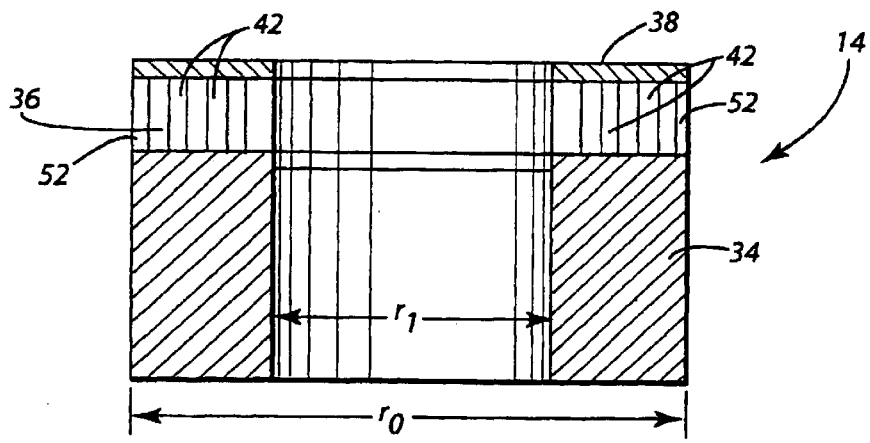
FIG. 5a is a detailed cross sectional view of the micro heat exchanger in the seal ring of the present invention.
Figure 5B:
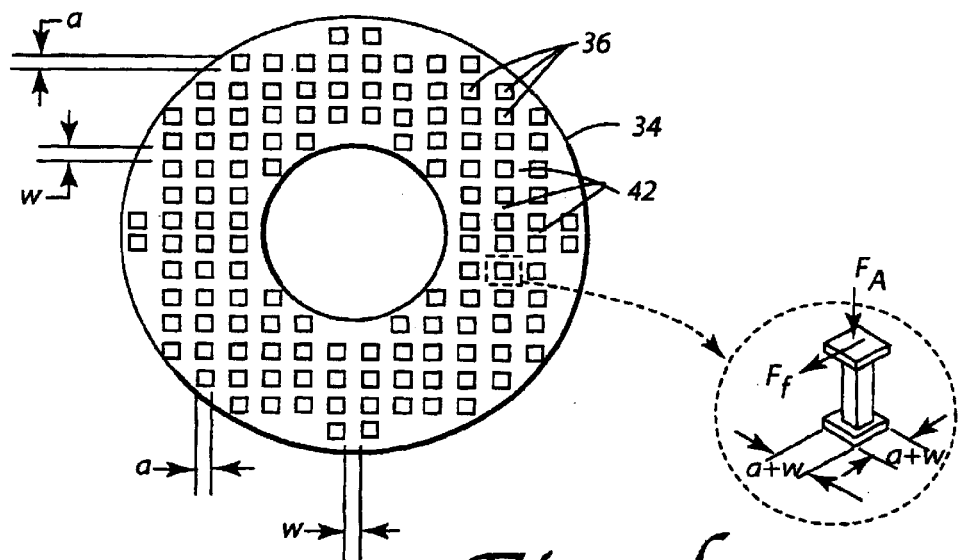

The seal assembly 10 of the present invention utilizes the micro heat exchanger 16 just below the load bearing interface of the stationary ring 14 to significantly alleviate the heating and wear problems and maintain the seal interface at a largely constant temperature. As best shown in detail in FIGS. 5a and 5b, the stationary seal ring 14 includes an annular backing ring 34 having an inner radius $r_i$ and an outer radius $r_o$ that serves as a substrate on which the micro heat exchanger 16 is constructed using a derivative of the LIGA micro-manufacturing process as described in Stephens, L. S., Kelly, K. W., Kountouris, D., McClean, J. and Coynell, J., "A Micro Heat Sink for Cooling Macroscale Conformal Surfaces Under the Influence of Thrust and Frictional Forces", IEEE/ASME Journal of Microelectromechanical Systems. As best shown in FIG. 5b, the micro heat exchanger 16 consists of a field of micron sized cooling fins or pins 36. A cooperating heat sink cover plate 38 including an inner radius $r_i$ and an outer radius $r_o$ is secured on the backing ring 34 adjacent the micro heat exchanger 16 so that the fins 36 and cover plate 38 are in contact. While the present invention is being described and illustrated with the fins 36 being formed on the annular backing ring 34, it should be appreciated that the fins 36 could just as easily be formed on one face of the heat sink cover plate 38.

The micron sized cooling fins 36 effectively form the interface between the backing ring 34 and cover plate 38. A coolant may be injected through the port 40 in the outer adaptor ring 20 into the micro heat exchanger 16 so that the coolant circulates through the passages 42 between the fins 36 and exits at the inner radius into a series of cooling fluid distribution and collection ports 44 radially arrayed around the drive shaft 26 in the inner adaptor ring 22. The combination of the fin geometry and micro scale make it possible to remove friction generated heat from the load bearing surface of the heat sink cover plate 38 extremely efficiently thus alleviating temperature related failures with no appreciable increase in component weight or volume.

The cooling fins 36 and heat sink cover plate 38 are typically constructed of nickel or alumina, but can be made of any material that is electroplatable or moldable through derivatives of the LIGA MEMs process. The optimal range for the thickness of the heat sink cover plate 38 is 10–5000 microns, depending on the specific application. For instance, a smaller thickness results in lower operating temperatures and increased hydrodynamic lubrication through local surface deformations. In fact, the local surface deformations can be engineered and controlled by regulating the coolant flow rate for a given sealing application. A larger heat sink cover plate thickness would be used to enable a near zero emissions seal due to the added dimensional stability.

The cooling fins 36 shown in FIG. 5b are of square cross section but it should be appreciated that almost any cross-section could be utilized including but not limited to round, elliptical, polygonal and mixtures thereof. Thus, the cross sectional shape could, for example, be triangular, rectangular, square, pentagonal, hexagonal, octagonal, trapezoidal, star-shaped and mixtures thereof. Typical cross-sectional dimensions, a, for the cooling fins 36 are 10–1000 microns and typical edge-to-edge spacing, w, are 100–1000 microns. The key consideration is the trade-off between heat dissipation ability, which is optimized by a larger edge-to-edge spacing, and load bearing capacity (the fins also function as structural members that support the loading bearing cover plate 38) which is optimized by a smaller edge-to-edge spacing. The heat sink cover plate 38 and/or the cooling fins 36 may also be coated to improve wear resistance and/or reduce the coefficient of friction between the rotating and stationary rings. The coating material may be selected from any known appropriate material suited for this purpose including but not limited to material selected from a group consisting of silicone carbide, tungsten carbide, carbon graphite, silicone nitride, diamond-like carbon and mixtures thereof.

A number of different arrangements may be utilized to cool the interface between the rotary seal ring 30 and the heat sink cover plate 38 of the stationary seal ring 14. In the embodiment shown in FIGS. 1a–1c, cooling fluid is delivered through the port 44 and/or the port 46, at a 90° angle to the port 40, formed in the outer adaptor ring 20. That cooling fluid flows through the passages 42 around the fins 36 and across the rear face of the cover plate 38 so as to provide cooling. The cooling fluid is then collected in the series of distribution and collection ports 44 that extend radially around the drive shaft 26 in the inner adaptor ring 22. Each of the distribution and collection ports 44 is provided in communication with an annular groove 48 and the cooling fluid flows from the ports 44 into the groove 48 from which it is subsequently delivered into the drain 50 formed in the end cap 24.

While two inlet ports 40, 46 are shown in the FIGS. 1a–1c embodiment, it should be appreciated that any number of inlet ports may be utilized although a smaller number is generally desired to reduce the number of connections to the cooling fluid pump. In any event, no matter how many inlet ports are provided, their cross-sectional flow area is at least five times or even 10–20 times greater than the flow area of the passages 42 of the micro heat exchanger 16. This ensures that the pressure drop due to coolant flow is very small.

As shown in FIGS. 1b and 1c, the ports 40, 46 include converging side walls that reduce the diameter of the ports and direct flow into the distribution annulus 52 which extends concentrically around the micro heat exchanger 16. The distribution annulus 52 functions to distribute the coolant circumferentially about the micro heat exchanger outer diameter in an even fashion. The coolant then flows evenly inward in the radial direction through the passages 42 around the fins 36. The even flow ensured by this construction allows the cooling fluid to maintain a largely uniform temperature distribution in a circumferential direction. The cross sectional flow areas of the collection ports 44, the groove 48 and the drain 50 are also maximized such that the pressure drop through these components is much smaller than that across the micro heat exchanger 16. O-rings 54 provided at various points between the stationary components including the stationary seal ring 14, outer adaptor ring 20, inner adaptor ring 22 and end cap 24 seal the flow pathway for the cooling fluid between these parts and prevent environmental contamination. A labyrinth seal (not shown) between the drive shaft 26 and the end cap 24 also functions to prevent environmental contamination and leakage of any fluid through that interface.

As should further be appreciated from viewing FIG. 1c, an additional cooling fluid delivery port 47 may be provided to direct cooling fluid into the pumped fluid and thereby provide direct cooling to the rotary sealing ring 30. This port 47 is strictly optional but may be provided when additional cooling is desired.

Figure 2:
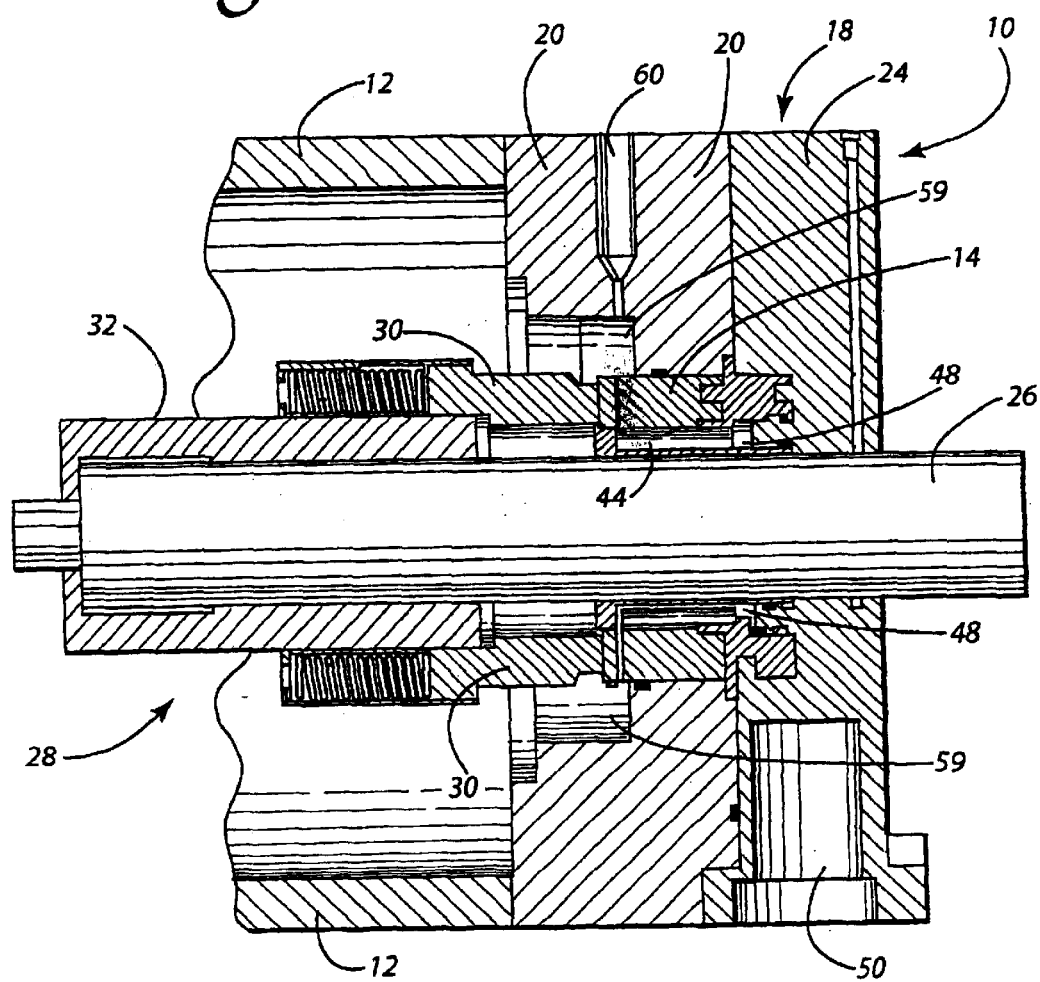
FIG. 2 is a cross sectional view of a second, alternative embodiment of the present invention.

A second embodiment of the seal assembly 10 of the present invention is shown in FIG. 2. In this embodiment the o-ring on the outer diameter of the stationary seal ring 14 and closest to the sealing interface has been eliminated. The outer adaptor ring 20 of the gland plate 18 has also been recessed at 59 such that the sealed fluid now flows through the cooling fins 36 and into the collection ports 44 as before. As should be appreciated, the inlet port 60 has been altered from the inlet ports 40, 46 shown in the FIGS. 1a–1c embodiment so that the external cooling fluid and the pumped fluid mix and flow through the cooling fins 36 of the micro heat exchanger 16. After passing through the micro heat exchanger 16, the fluid is collected in the collection ports 44 for delivery to the groove 48 and drain 50. The discharge from the drain 50 can be redirected to the pump suction or any other desired location.

The design of the FIG. 2 embodiment is beneficial because it eliminates the requirement for a separate, external cooling system for the micro heat exchanger 16. This approach, however, will not work in all applications since some pumped fluids will contain a high percentage of small solids that could plug the micro-sized passages 42 of the micro heat exchanger 16.

Figure 3:
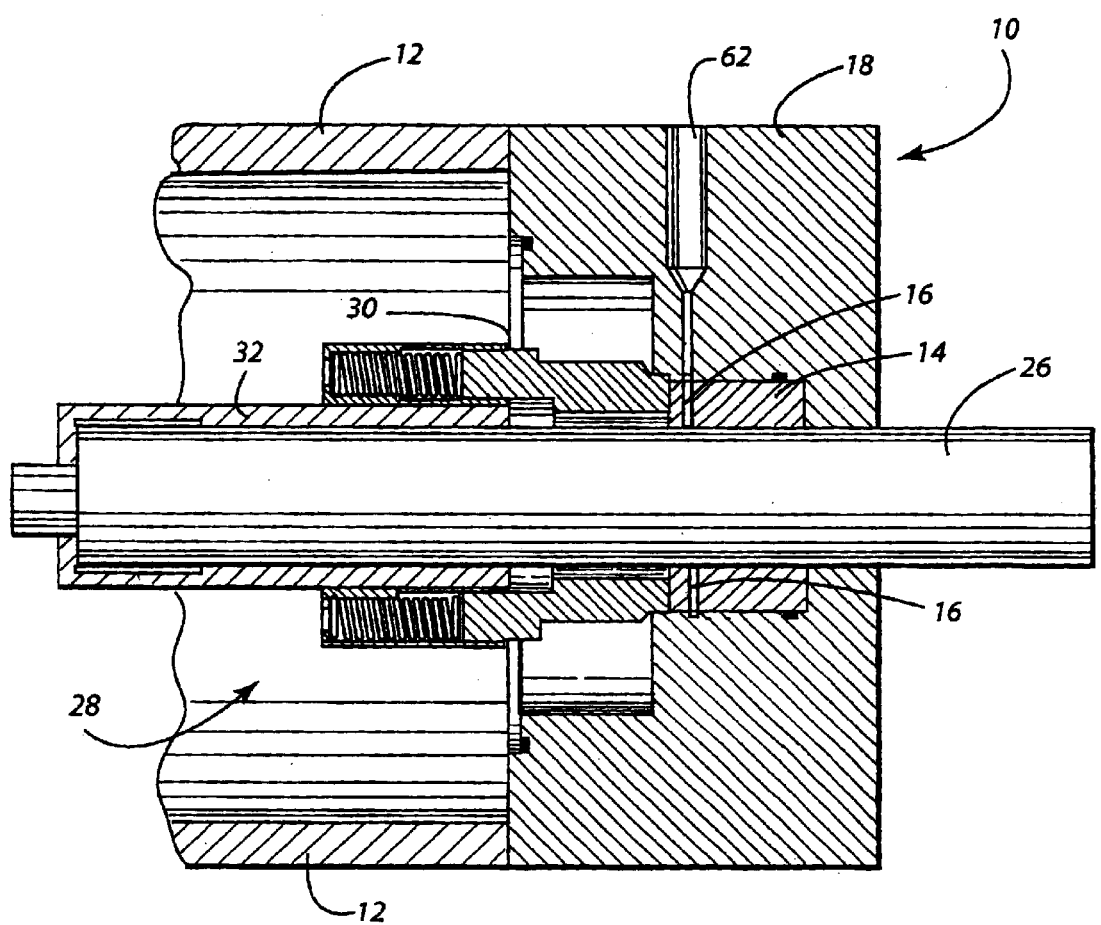
FIG. 3 is a cross sectional view of a third, alternative embodiment of the present invention.

Yet a third alternative embodiment of the seal assembly 10 of the present invention is shown in FIG. 3. In this embodiment, a gas is used as the coolant for the micro heat exchanger 16. Preferably an inert gas like nitrogen is utilized. In this embodiment, there is no need for a separate coolant return header and, therefore, a simple one-piece gland plate 18 may be utilized. The coolant delivery port 62 is similar in design to the coolant delivery port 40 shown in the FIGS. 1a–1c embodiment with the same considerations regarding large flow area, reduced pressure drop and even distribution of coolant circumferentially in the distribution annulus 52 around the stationary seal ring 14 about the micro heat exchanger 16. If an inert gas such as nitrogen is utilized as the coolant, upon exit from the micro heat exchanger 16, it flows axially down the drive shaft 26 past the labyrinth seal (not shown) to the environment. Two benefits of this design are that the gland plate 18 is much simpler and, therefore, less costly to produce and the average diameter of the mechanical seal rings is smaller such that less heat is generated.

Figure 4:
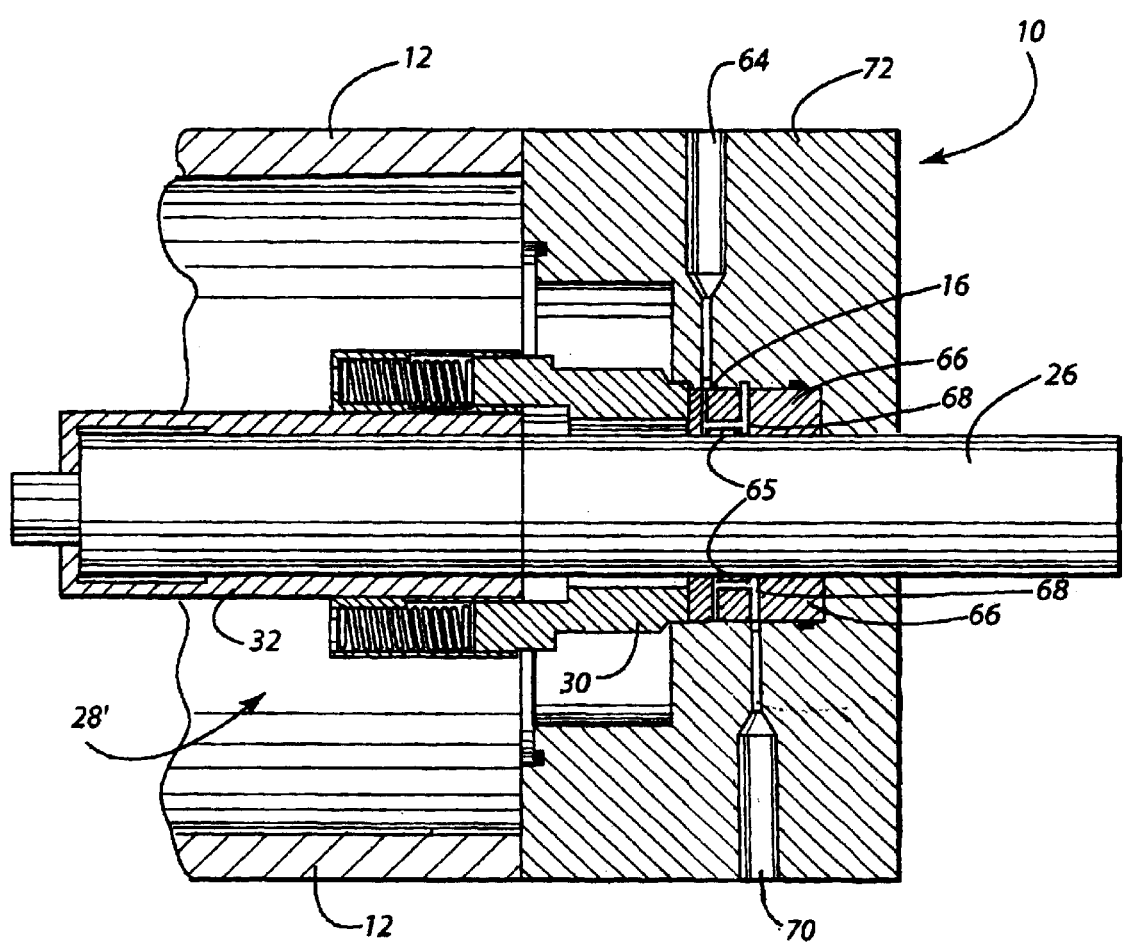
FIG. 4 is a cross sectional view of a fourth, alternative embodiment of the present invention.

Yet another alternative embodiment of the present invention is shown in FIG. 4. In this embodiment of the seal assembly 10, coolant passes through the delivery port 64 then along the distribution annulus 52 around the circumference of the stationary seal ring 66 about the micro heat exchanger 16 then through the passages 42. The coolant is then collected in a series of collection ports 65 axially arrayed around the drive shaft 26 in the stationary seal ring 66. The coolant then passes through the collection annulus 68 and out through the drain 70 which is provided in the gland plate 72 opposite the delivery port 64. In this embodiment, the inlet and outlet from the stationary seal ring 66 are both provided in the outer diameter of that ring. The advantages of this design are that the stationary seal ring 66 and rotary seal ring 74 have a smaller average diameter such that less heat is generated and the resulting gland plate 72 is a simple one piece unit and therefore less costly to manufacture. The same design features for the cooling supply and returns in the gland plate 72 still apply to this design: that is, low pressure drop as compared to the micro heat exchanger 16 and the ability to evenly distribute the coolant about the circumference of the micro heat exchanger such that uniform flow across the cooling fins 36 results.

In summary, numerous benefits result from employing the concepts of the present invention. The seal assembly 10 of any of the embodiments shown in FIGS. 1a–4 of the present invention all rely upon a micro heat exchanger 16 just below the load bearing interface between the rotary seal ring 30 and stationary seal ring 14 or 66 to significantly alleviate the heat and wear problems and maintain the seal interface at a largely constant temperature. The stationary ring 14 or 66 with micro heat exchanger 16 is integrated into a modular gland plate design and can be used in addition to, or in place of, an external cooling flush. The sealing interface is maintained at a largely uniform temperature which is very close to the temperature of the coolant circulating through the micro heat exchanger 16. The propensity for thermal hot spots is significantly reduced resulting in enhanced reliability and sealing performance. Advantageously, the heat tolerance of the new seal ring and gland plate design allows it to operate as a near zero emissions device thus reducing volatile organic compounds and toxic emissions to the environment.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, the pumped fluid could be used to provide all of the cooling through the micro heat exchanger 16. Such a design would eliminate the need for o-rings at the overplating section of the micro heat exchanger thereby allowing the use of thinner overplating. This reduces manufacturing costs. The embodiment shown in FIG. 4 could be modified and the collection ports 64 could be provided at different angles so as to discharge spent cooling fluid in any desired direction. The flow direction of the cooling fluid in the illustrated embodiments could be reversed. Any number of modifications of this nature are possible.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A seal assembly for intended use in a machinery housing including a rotating drive shaft, comprising:
   a rotary seal ring contacting
   a stationary seal ring having a micro heat exchanger; and
   a gland plate securing said stationary seal ring to said machinery housing, said gland plate including a first cooling fluid port in communication with said micro heat exchanger.

2. The assembly of claim 1, wherein said gland plate further includes a second cooling fluid port in communication with said micro heat exchanger, said first cooling fluid port acting as a cooling fluid inlet while said second cooling fluid port acts as a cooling fluid outlet.

3. The assembly of claim 2, further including a cooling fluid supply for circulating cooling fluid through said micro heat exchanger.

4. The assembly of claim 1, wherein said gland plate includes an annular groove and a group of cooling fluid collection ports in communication with said annular groove and said micro heat exchanger.

5. The assembly of claim 4, wherein said first cooling fluid port has a flow area A, where A>5B and B is equal to flow area of said micro heat exchanger.

6. The assembly of claim 1, wherein said stationary seal ring includes a heat sink cover plate and a backing ring.

7. The assembly of claim 6 wherein said cover plate is coated with a material selected from a group consisting of silicon carbide, tungsten carbide, carbon graphite, silicon nitride, diamond-like carbon and mixtures thereof.

8. The assembly of claim 6, wherein said micro heat exchanger comprises a plurality of cooling fins carried on one of said heat sink cover plate and said backing ring.

9. The assembly of claim 8, wherein each of said plurality of cooling fins has a cross-sectional dimension of between about 10–1000 microns.

10. The assembly of claim 9, wherein edge-to-edge spacing between adjacent cooling fins is about 100–1000 microns.

11. The assembly of claim 8, wherein said heat sink cover plate has a thickness of about 10–5000 microns.

12. The assembly of claim 8, wherein said plurality of cooling fins have a cross-sectional shape selected from a group consisting of round, elliptical, polygonal, and mixtures thereof.

13. The assembly of claim 8, wherein said plurality of cooling fins have a cross-sectional shape selected from a group consisting of triangular, rectangular, square, pentagonal, hexagonal, octagonal, trapezoidal, star-shaped, and mixtures thereof.

14. The assembly of claim 2, wherein said gland plate further includes a third port for delivering an exterior cooling flush fluid to said seal assembly.

15. The assembly of claim 8, wherein said plurality of cooling fins are coated with a material selected from a group consisting of silicon carbide, tungsten carbide, carbon graphite, silicon nitride, diamond- like carbon and mixtures thereof.

16. The assembly of claim 1, wherein an interface between the gland plate and the drive shaft associated with the machinery housing is sealed.

17. The assembly of claim 1, wherein said seal ring includes at least one O-ring seal for sealing said cooling fluid in said micro heat exchanger.

18. The assembly of claim 1, further including a cooling fluid supply for circulating cooling fluid through said micro heat exchanger.

19. A seal assembly for a machinery housing including a shaft comprising:
a rotary seal ring contacting
a stationary seal ring having a micro heat exchanger and an opening;
a gland plate for securing said seal ring to said machinery housing, said gland plate including a port for introducing a cooling fluid to the micro heat exchanger and an adaptor ring in the opening;
wherein the adaptor ring and stationary seal ring together define a space adjacent the shaft for receiving the cooling fluid from the micro heat exchanger.

20. A seal assembly for a machinery housing, comprising:
a rotary seal ring contacting
a stationary seal ring having a micro heat exchanger; and
a gland plate for securing said stationary seal ring to said machinery housing and contacting the seal ring on at least three sides, said gland plate including a first cooling fluid port in communication with said micro heat exchanger.

21. The assembly of claim 20, wherein the gland plate is unitary.

22. A seal assembly for a machinery housing, comprising:
a rotary seal ring contacting
a stationary seal ring having a micro heat exchanger and including a distribution annulus, a collection annulus, and an array of collection ports connecting the distribution annulus to the collection annulus; and
a gland plate for securing said stationary seal ring to said machinery housing, said gland plate including a first cooling fluid port in communication with the collection ports of said stationary seal ring.

23. The assembly of claim 22, wherein a shaft is positioned in the housing and the collection ports are axially arrayed around the shaft.

\* \* \* \* \*